US011210811B2

(12) United States Patent
Jiang et al.

(10) Patent No.: US 11,210,811 B2
(45) Date of Patent: Dec. 28, 2021

(54) REAL-TIME THREE-DIMENSIONAL CAMERA CALIBRATION

(71) Applicant: Intel Corporation, Santa Clara, CA (US)

(72) Inventors: Yong Jiang, Shanghai (CN); Caihong Ma, Shanghai (CN); Xiaorui Xu, Shanghai (CN); Mahamood Hussain, Bellevue, WA (US)

(73) Assignee: INTEL CORPORATION, Santa Clara, CA (US)

( * ) Notice: Subject to any disclaimer, the term of this patent is extended or adjusted under 35 U.S.C. 154(b) by 261 days.

(21) Appl. No.: 16/339,251

(22) PCT Filed: Nov. 3, 2016

(86) PCT No.: PCT/CN2016/104407
§ 371 (c)(1),
(2) Date: Apr. 3, 2019

(87) PCT Pub. No.: WO2018/081967
PCT Pub. Date: May 11, 2018

(65) Prior Publication Data
US 2019/0236806 A1    Aug. 1, 2019

(51) Int. Cl.
*G06T 7/80*    (2017.01)
*G06F 17/16*    (2006.01)

(52) U.S. Cl.
CPC ........... *G06T 7/85* (2017.01); *G06F 17/16* (2013.01); *G06T 7/80* (2017.01);
(Continued)

(58) Field of Classification Search
None
See application file for complete search history.

(56) References Cited

U.S. PATENT DOCUMENTS

| 2012/0121128 | A1* | 5/2012 | Lawrence | ............. | A63F 13/573 |
| | | | | | 382/103 |
| 2015/0348271 | A1* | 12/2015 | Kotake | ................. | G01S 17/875 |
| | | | | | 382/199 |
| 2017/0083775 | A1* | 3/2017 | Grauer | .................. | H04N 7/183 |

FOREIGN PATENT DOCUMENTS

| CN | 103337066 | | 10/2013 |
| CN | 104376558 | A | 2/2015 |
| WO | 2016018392 | A1 | 2/2016 |

OTHER PUBLICATIONS

International Search Report and Written Opinion for related PCT/CN2016/104407, filed Nov. 3, 2016, dated Aug. 7, 2017, 11 pages.
(Continued)

*Primary Examiner* — Tahmina N Ansari
(74) *Attorney, Agent, or Firm* — Hanley, Flight & Zimmerman, LLC

(57) ABSTRACT

In one example, a system for real-time three-dimensional (3D) calibration includes a processor detecting mark corners at two-dimensional (2D) coordinates in an image coordinate system of an image of a specified pattern. The processor determines 3D coordinates of the mark corners in a world coordinate system based on the pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values.

25 Claims, 8 Drawing Sheets

(52) U.S. Cl.
CPC ............... *G06T 2207/10024* (2013.01); *G06T 2207/10028* (2013.01); *G06T 2207/10048* (2013.01); *G06T 2207/30204* (2013.01)

(56) References Cited

OTHER PUBLICATIONS

International Bureau, "International Preliminary Report on Patentability," issued in connection with International Patent Application No. PCT/CN2016/104407, dated May 7, 2019, 5 pages.

* cited by examiner

200A

200B

200C

200D

400

500

REAL-TIME THREE-DIMENSIONAL CAMERA CALIBRATION

CROSS REFERENCE TO RELATED APPLICATIONS

Pursuant to 35 U.S.C. § 371, this application is the United States National Stage Application of International Patent Application No. PCT/CN2016/104407, filed on Nov. 3, 2016, the contents of which are incorporated by reference as if set forth in their entirety herein.

BACKGROUND

Real-time three-dimensional (3D) camera calibration is useful when a 3D camera is not able to determine the real-world, 3D coordinates of the subjects in the 3D camera's field of view. Calibration can include identifying errors in the 3D camera's coordinate system calibration, and re-orienting the 3D image to align its own perception of coordinates to real world, 3D coordinates.

When a 3D camera becomes un-calibrated, the 3D camera's ability to determine 3D coordinates in real-world space can be diminished. More specifically, the ability to judge distance may become unreliable. The 3D camera's sense of space may become distorted in this way if the 3D camera is jarred, e.g., while putting the 3D camera in its case, dropped on the floor, experiences thermal expansion or contraction of lens elements, and the like.

Not being able to determine the actual 3D coordinates of a camera image subject affects the ability of the 3D camera to create quality 3D pictures. The 3D camera may not be able to produce images that accurately represent the real world coordinates because the 3D camera is placing pixels of the image at the wrong depth. Additionally, placing pixels at the wrong depth may make the image appear fuzzy, out of focus, and result in erroneous measurements. Further, without being able to judge distance reliably, the 3D camera cannot focus its lens on the subjects in order to take the picture properly. This also affects the quality of the pictures taken because the subjects in the images may appear out of focus.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

In addition to becoming un-calibrated due to incidents like jarring, a 3D camera may also become un-calibrated from heat generated by the 3D camera itself. However, as described below, in some embodiments, the 3D camera may be dynamically calibrated, using only one frame of information.

Figure 1:
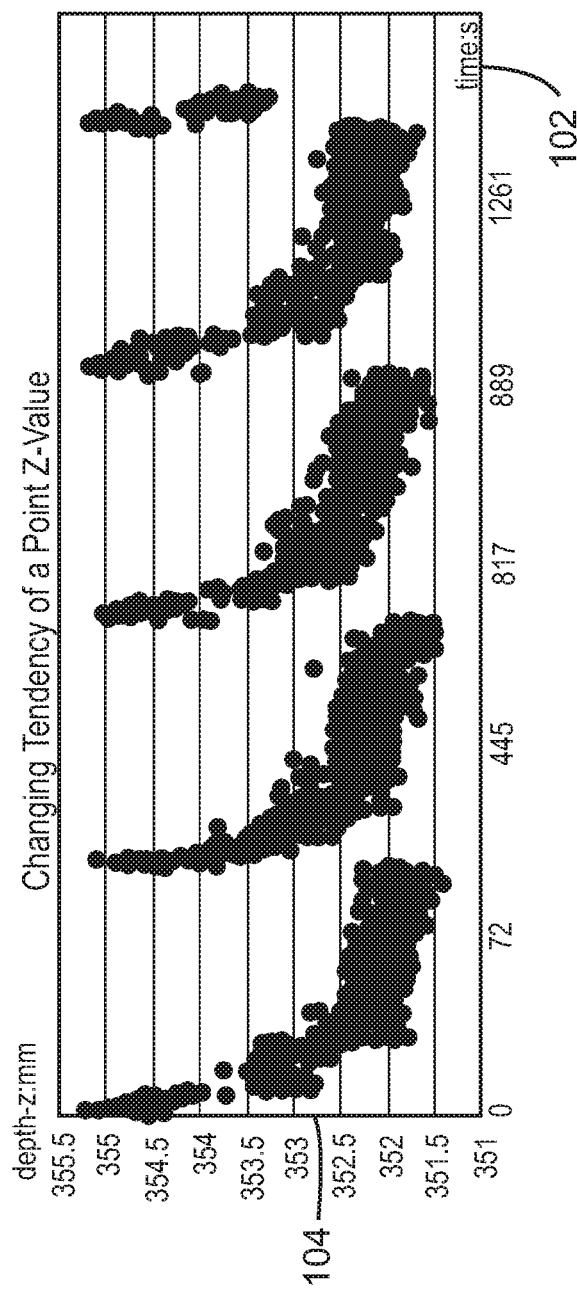
FIG. 1 is a graph showing a 3D camera's calibration becoming distorted when the 3D camera runs for a period of time.

FIG. 1 is a graph 100 showing a 3D camera's calibration becoming distorted when the 3D camera runs for a period of time during repeated operations of the 3D camera. In FIG. 1, X axis 102 represents the running time, and Y axis 104 represents the perceived z-coordinate value of an example point (x, y, z), that is at a known z-value (that is, a depth z in millimeters). The repeated operations involve starting (or re-starting) the 3D camera for a period of time (for example, for 97 seconds), setting the 3D camera to sleep for a period of time (for example, for 300 seconds), and repeating for 4 cycles. As the chart shows, the z-coordinate value determined by the increasingly warm 3D camera changes with running time, indicating that the accuracy of the 3D camera's calibration diminishes over the time that the 3D camera is powered on.

As stated previously, keeping a 3D camera calibrated is useful for taking and creating clearly focused, 3D images that are representative of the appearance of the photographed object in the real world. Additionally, calibration can be considered to be maintenance on the 3D camera itself that is repeated because the calibration of the 3D camera is susceptible to its heat-generating influence on the ambient environment.

In some embodiments, the 3D coordinates of an object perceived to be at a coordinate point (x, y, z) (due to a mistaken z-value) are translated to 3D coordinates of a camera coordinate system so that the actual z-value of the object's location may be determined. In this way, it is possible to determine the amount of error in the 3D camera's perception of 3D real-world coordinate space. Knowing the amount of error when the camera is uncalibrated makes it possible to correct this perception, thus calibrating the 3D camera. The 3D real-world coordinate space is a real-world environment, organized spatially by coordinates from a specific perspective.

It is possible to determine the depth values of all the points of a plane if the relative locations of a given set of points are known, and the internal reference of the 3D camera is known. These determined depth values may be used as baselines to build a fitting model that maps the original, erroneous coordinates perceived by the uncalibrated 3D camera, to corrected coordinates. The fitting model can map the original depth to the corrected depth. In this respect, in some embodiments, the fitting model may be employed using a linear equation, multivariate equation, equation of higher degree or other complex fitting method(s) or mathematical methods.

By positioning mark points in the depth view field of the 3D camera, a fitting model to determine the mapping can be created, and updated. A mark point is a designated geometric figure, placed within a coordinate system, such that the figure may be used to calibrate a 3D camera. If there are more than four mark points on a plane, and if the relative position between each of the mark points is known, a real-time 3D camera calibration model can be built according to some embodiments based on Function 1.

$$s \begin{bmatrix} u \\ v \\ 1 \end{bmatrix} = A[R \mid T] \begin{bmatrix} X_w \\ Y_w \\ Z_w \\ 1 \end{bmatrix} \quad \text{FUNCTION 1}$$

Function 1 describes a transformation relationship of a mark point when it is in the image, 3D real-world, and 3D camera coordinate systems. That is, in some embodiments, [R|T] is a parameter matrix that translates coordinates of a point (x, y, z) to another coordinate system, fixed with respect to the camera. However, the 3D camera coordinate system is constructed based on the image coordinate system and the 3D real-world coordinate system.

The image coordinate system is a two-dimensional (2D) coordinate system occupying the space for images in a photograph. The 2D coordinate (u, v) represents the position of the mark point in the 2D image.

The 3D coordinate, $(X_w, Y_w, Z_w)$ represents the position of the mark point in the real-world coordinate system. The variable, A, references a 3D camera parameter matrix of intrinsic parameters. The matrix, [R|T] is a 3D camera parameter matrix of extrinsic parameters that can transform the position of the mark point from the world coordinate system to its position in the camera coordinate system based on Function 2.

$$\begin{bmatrix} X_c \\ Y_c \\ Z_c \end{bmatrix} = [R \mid T] \begin{bmatrix} X_w \\ Y_w \\ Z_w \\ 1 \end{bmatrix} \quad \text{FUNCTION 2}$$

In Function 2, (Xc, Yc, Zc) is the 3D position of the mark point in the camera coordinate system. In some embodiments, it is this 3D coordinate that is corrected. In fact, the actual depth value of each pixel point in the depth image is determined. That means that every pixel in the 2D depth image maintains the original 2D coordinate (u, v), but are assigned a new depth value. Depth value can also be referred to as pixel value, and as z-value in the camera coordinate system. Once the depth value of a pixel is changed, its corresponding location in the camera coordinate system is changed accordingly. In this way, the x, y, and z values are determined in the camera coordinate system to be changed.

Figure 2A:
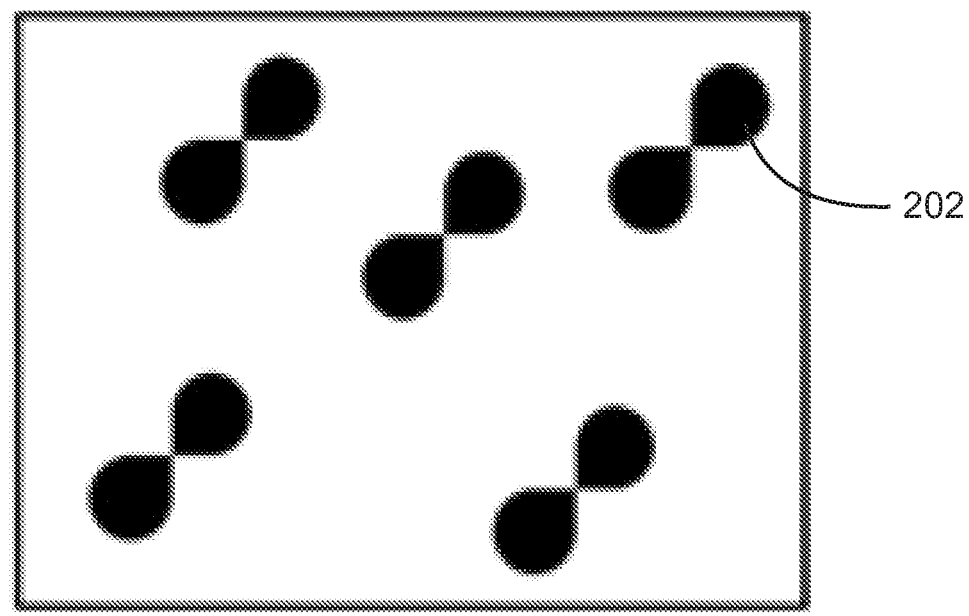
FIGS. 2A-2D include a diagram of an example pattern that may be used for real-time 3D calibration, and corresponding images represented as captured with a red-green-blue (RGB) sensor, infrared (IR) sensor, and depth sensor of a 3D camera.

FIG. 2A is a diagram 200A of mark points 202 used to calibrate 3D cameras in real-time according to some examples. As stated previously, a mark point may be any geometric figure according to some embodiments. In the embodiment illustrated in FIG. 2A, a solid infinity symbol is the designated mark point 202.

Figure 2B:
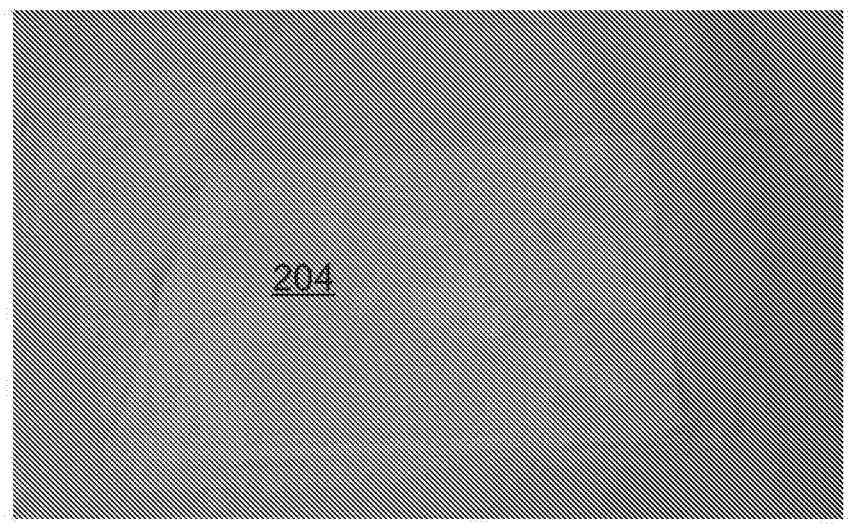

FIG. 2B is a red-green-blue (RGB) image capture 200B of a pattern of mark points printed on a surface 204 in infrared absorption liquid. In some embodiments, the example printed pattern may not be viewed without an infrared (IR) sensor.

Figure 2C:
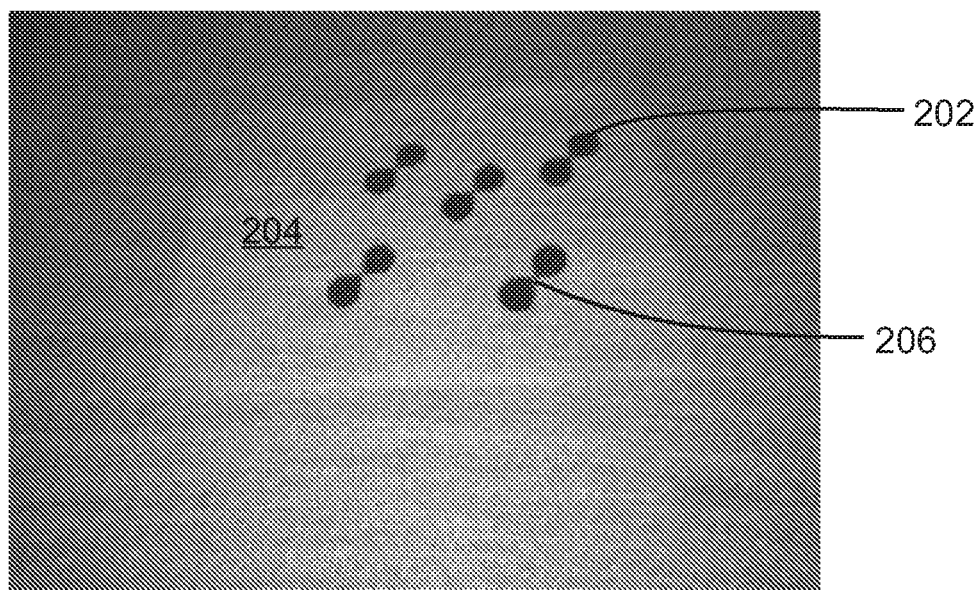

FIG. 2C is an IR sensor image capture 200C of the pattern of mark points 202 printed on the surface 204 in infrared absorption liquid. The IR sensor image capture 200C matches the pattern of mark points 202 in FIG. 2A. The corner 206 of the mark point 202 is a predefined point, also used in the calibration, described below.

Figure 2D:
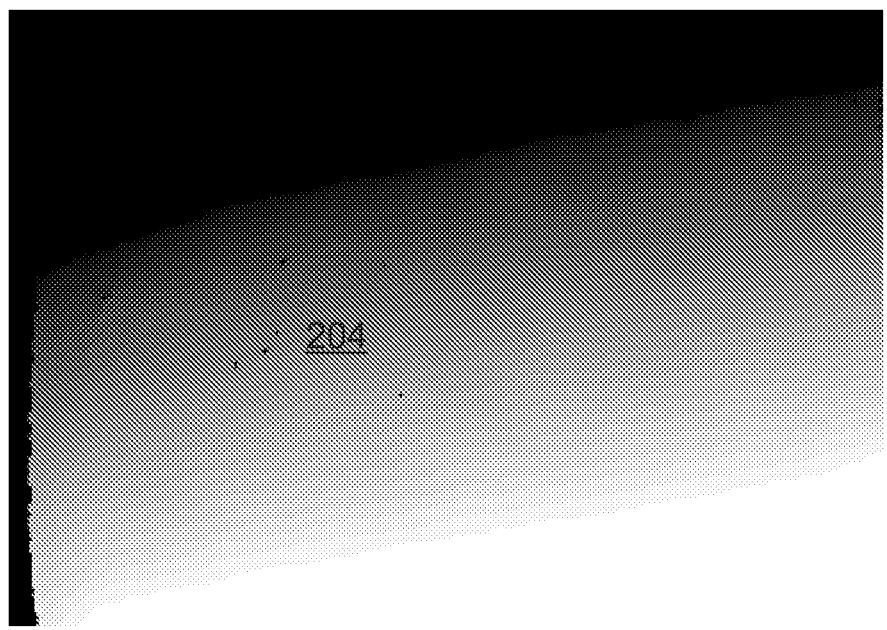

FIG. 2D is a depth sensor image capture 200D printed on a surface 204 in infrared ink. The IR ink does not show in the image capture 200D. Rather, the depth sensor shows the distance of each point on the surface 204. The relatively lighter regions of the depth sensor image capture 200D indicate points closer to the camera.

Once the pattern has been recorded in the IR ink, the 3D camera itself may be used to perform the calibration. To perform the calibration, the 3D camera determines the coordinates of the corners 206 of the mark points 202, in the image and world coordinate systems. The corner 206 is a designated point on the mark point, and may be defined based on the geometric form the mark point takes. Various forms may be used in various embodiments, such as the corners of a triangle, cross point of two lines, the sharpest corner of a geometric figure, the symmetric center of a geometric figure, the center of a circle, and so on, and/or other forms. Finding the corner 206 of a mark point 202 depends on predetermined characteristics of the corner.

In this example, the corner 206 of a mark point as illustrated in FIG. 2C is the sharpest point of the mark point, has the smallest angle, and is the symmetry center of the mark point 202. Based on these tips, the corner 206 can be detected successfully.

In some embodiments, the corners 206 of the mark points 202 of the pattern are identified by using the IR image, e.g., illustrated in FIG. 2C. Since the 3D camera acquires the depth information of every pixel by IR, every pixel in the IR sensor image capture 200C has a one-to-one relationship with a pixel in the RGB image capture 200B, and with a pixel in the depth sensor capture 200D. Accordingly, in some embodiments, it is possible to determine the 2D coordinates (u, v) of the corners in the IR sensor image capture 200C, instead of in the depth sensor image capture 200D.

Figure 3:
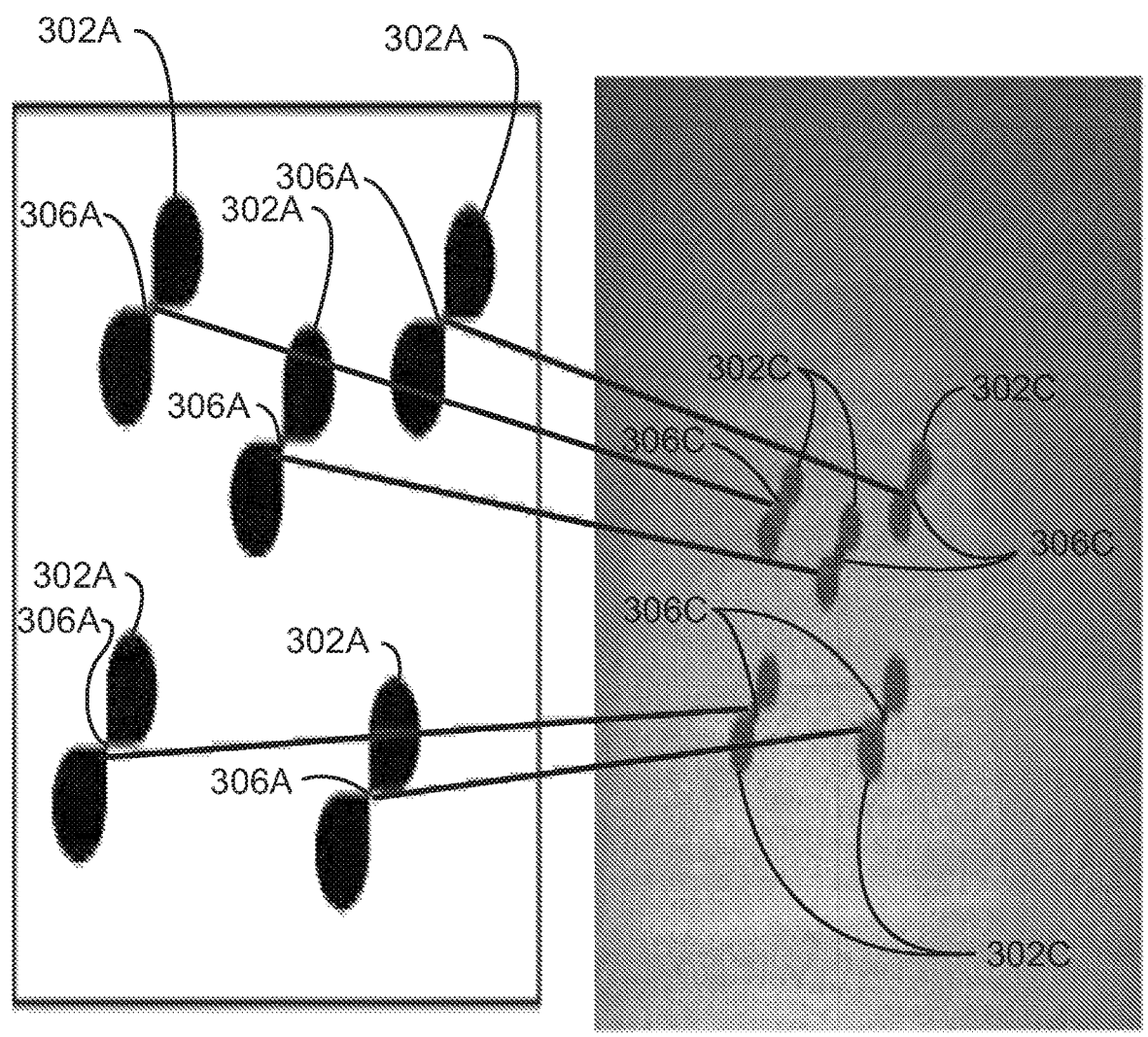
FIG. 3 is a diagram showing the corresponding relationship between mark points from an original pattern and an infrared (IR) image.

FIG. 3 is a diagram showing the corresponding relationship between the mark points from the original pattern 200A illustrated in FIG. 2A and the IR sensor image capture 200C illustrated in FIG. 2C. The pattern 200A shows mark points 302A, and their corresponding corners 306A. Similarly, the IR sensor image capture 200C includes mark points 302C, and corresponding corners 306C. The distance between the corners 306C is determined from the pattern 200A and the IR sensor image capture 200C by correlating the corners 306A to the corners 306C. As illustrated in FIG. 3, the five lines between the corners 306A and the corners 306C represent this correlation. Based on the difference in the print scale between that of the pattern 200A and that of the real plane represented by the image capture 200C, the 3D coordinates $(X_w, Y_w, Z_w)$ of the corners 306 are determined in the world coordinate system.

The transformation [R|T] may then be determined, which may be used to acquire the location of the mark points in the camera coordinate system. The matrix of A may be determined from the intrinsic parameters of the 3D camera; therefore, the transformation [R|T] may then be determined using Function 1. Additionally, the location of the mark points in the camera coordinate system may be determined using Function 2.

A fitting model may then be determined to correct the depth values provided by the un-calibrated 3D camera. The variable, s, in Function 1, is a normalizing factor. If s is known, it is possible to determine all the 3D points in the camera coordinate system that share the same plane with the mark points. However, s is unknown. Thus, using Function 3 it is possible to determine a 3D point, $(X_{temp}, Y_{temp}, Z_{temp})$, in the camera coordinate system that shares the same line with the 3D camera's optical center, (0, 0, 0), and a 3D point whose corresponding 2D coordinate is (u, v).

$$\begin{bmatrix} X_{temp} \\ Y_{temp} \\ Z_{temp} \end{bmatrix} = A^{-1} \begin{bmatrix} u \\ v \\ 1 \end{bmatrix} \quad \text{FUNCTION 3}$$

In Function 3, the (u, v) coordinate represents the 2D values of a point on the 2D image, and the $(X_{temp}, Y_{temp}, Z_{temp})$ coordinate represents a location in the camera coordinate system. Although the coordinate $(X_{temp}, Y_{temp}, Z_{temp})$ may not be equal to the coordinate $(X_c, Y_c, Z_c)$ of point (u,v) in the camera coordinate system, the 3D camera's optical center, (0, 0, 0), the coordinate $(X_{temp}, Y_{temp}, Z_{temp})$ and coordinate $(X_c, Y_c, Z_c)$ share the same line. Connecting the 3D camera's optical center and the coordinate, $(X_{temp}, Y_{temp}, Z_{temp})$ creates a straight line, referred to herein as Line-A. It is then possible to determine the intersection point of Line-A and the plane determined by the mark corners, i.e., the mark plane. This intersection point is the location of the 2D point (u, v) in the 3D camera coordinate system. Accordingly, it is possible to determine all the 3D points $(X_c, Y_c, Z_c)$ on the mark plane. Because the value $Z_c$ is the depth baseline, a fitting model may be generated that maps the original depth values to the baseline values.

Further, using the fitting model and Function 4, the 3D coordinates of an object in the 3D camera's view field may be updated by updating the depth value of each point of the object. In the camera coordinate system, the depth value is equal to the $Z_c$ value. Since the optical center, original point, and corrected point are on a straight line, Function 4 may then be used to determine the new 3D coordinate.

$$\frac{X_{updated}}{X_0} = \frac{Y_{updated}}{Y_0} = \frac{Z_{updated}}{Z_0} \quad \text{FUNCTION 4}$$

In Function 4, the coordinates, $(X_o, Y_o, Z_o)$ represent the original real-world coordinates as determined by the uncalibrated camera. The coordinates $(X_{updated}, Y_{updated}, Z_{updated})$ represent the updated real-world coordinates. Using this method on all the points of the object, it is possible to get the corrected 3D model. As long as the mark corners are in the view field of the 3D camera, the calibration method can be run and the 3D points can be updated in real-time.

Figure 4:
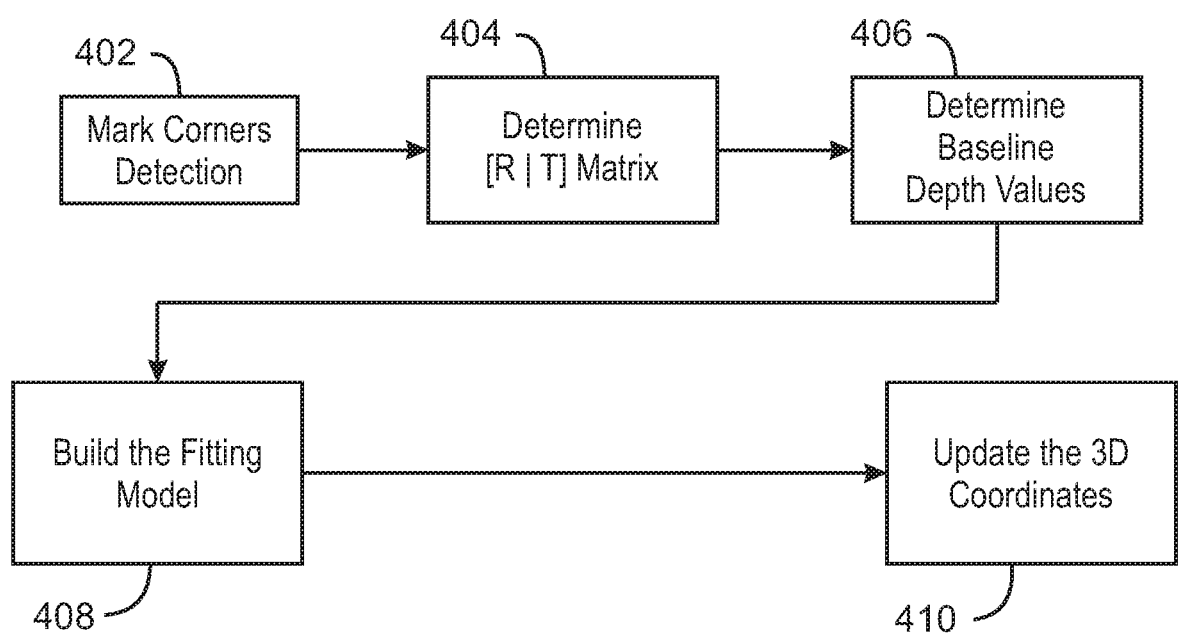
FIG. 4 illustrates a process for real-time 3D calibration.

FIG. 4 is a process flow diagram 400 for real-time 3D calibration. In some embodiments, flow diagram 400 represents a method. Flow 400 begins at block 402, where detection of one or more mark corners is performed. In the mark corners detection 402, the corresponding relationship that maps the mark corners from 2D points in an image coordinate system to the 3D points in a world coordinate system is built. In an example implementation, the 2D coordinates of the mark points may be identified in an IR image, and the 3D coordinates may be determined based on the mark corner's pixel coordinates in the original pattern, and printer scale.

At block 404, the 3D camera parameter matrix [R|T] is determined. As stated previously, the parameter matrix [R|T] can transform the point from the real-world coordinate system to the camera coordinate system.

At block 406, the baselines of depth values may be acquired. In some examples, this can include determining the corrected camera coordinate system location of some proper points on the mark plane. The Z values of these 3D points are the baselines.

At block 408, the fitting model is built. In one embodiment, the fitting model is built by mapping the original depth values to the baselines.

At block 410, the 3D coordinates are updated. This can include updating the 3D points to construct the new 3D model of the object. The fitting model built in block 408 is globally optimized. Therefore, it is adapted to correct a large range of depth values. Accordingly, the depth value of a point that is not even on the mark plane can be updated based on the fitting model. Using the fitting model, the 3D location can also be corrected.

Figure 5:
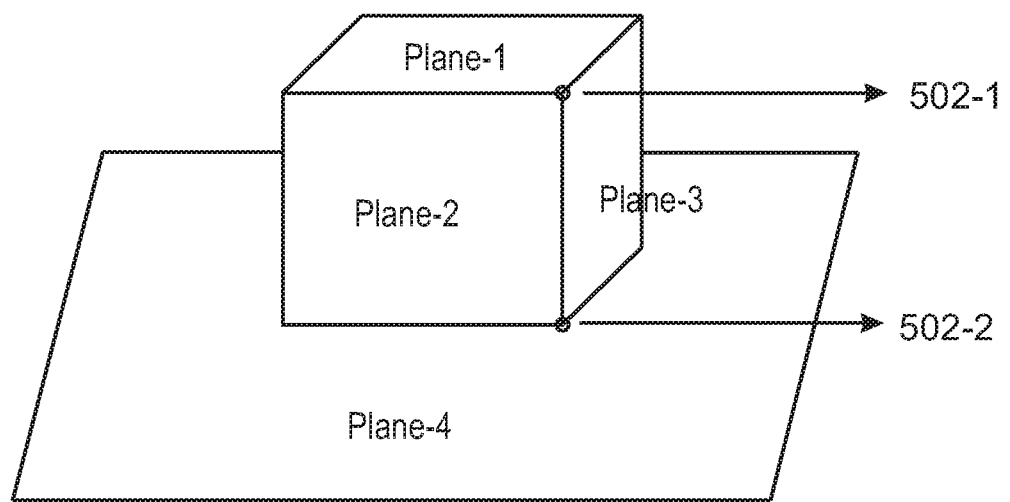
FIG. 5 is a diagram of intersecting planes used to test the accuracy of real-time three-dimensional (3D) calibration.

FIG. 5 is a diagram of intersecting planes used to test the accuracy of real-time 3D calibration. In an example implementation, the line from point 502-1 to point 502-2, created by the intersection of planes 2 and 3, and located between planes 1 and 4 is measured using a highly accurate measurement device, such as a Vernier caliper. The distance determined by the 3D camera before and after real-time calibration is compared according to some examples.

Figure 6:
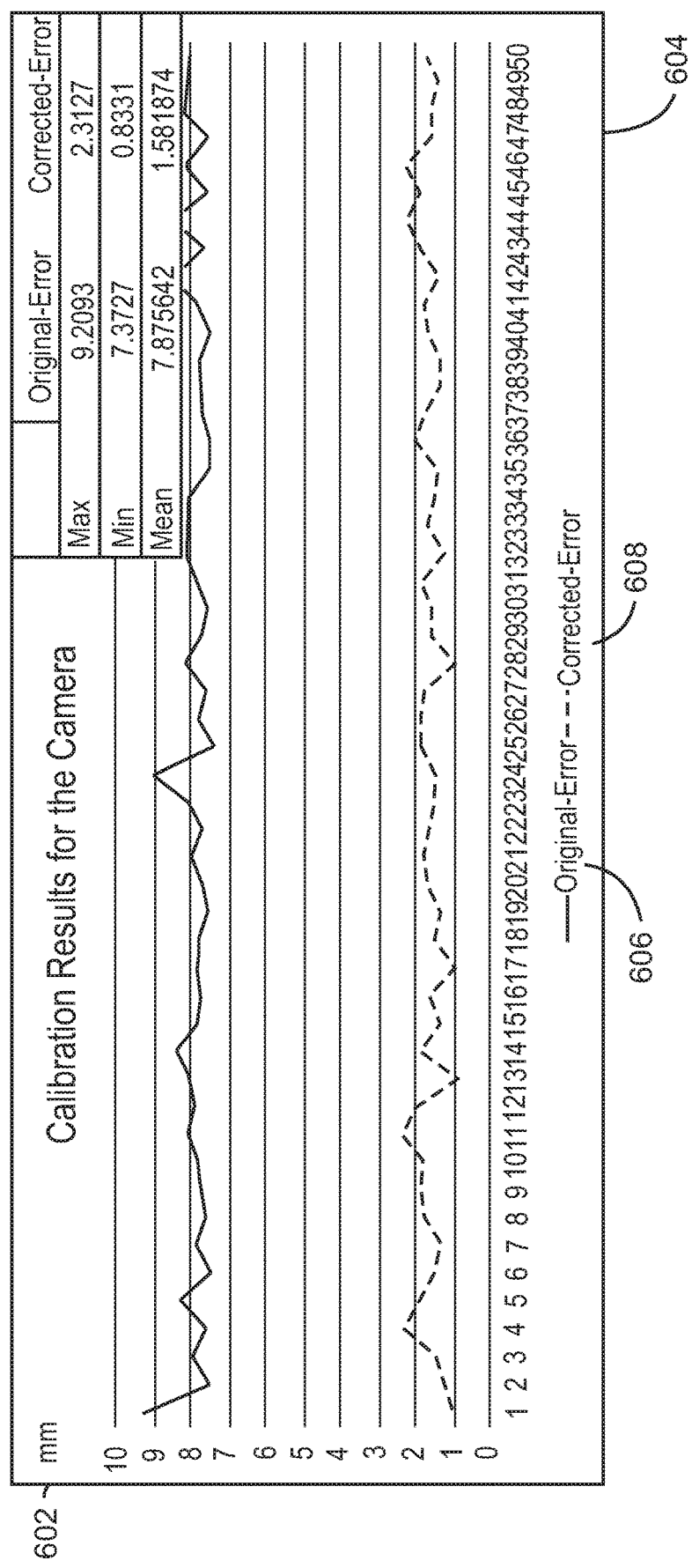
FIG. 6 is a graph representing results of the test described with respect to FIG. 5, before and after real-time 3D calibration according to some techniques described herein.

FIG. 6 is a graph representing the results of the test described with respect to FIG. 5, before and after real-time 3D calibration according to some embodiments. In the graph 600, the Y axis 602 represents the difference between the measurement result provided by a 3D camera, and the corresponding Vernier caliper measurement (in millimeters [mm]). The X axis 604 represents serial numbers of the images used to perform the test. The original error graph line 606 labeled, illustrated with a solid line in FIG. 6, represents the size of the error in the 3D camera before real-time 3D calibration according to some examples. The corrected error graph line 608 illustrated with a dotted line in FIG. 6 represents the size of the error from the 3D camera after real-time 3D calibration according to some examples. The table shown within the graph 600 provides the maximum, minimum, and mean size of the original and corrected error for all the images used in the test. The difference between the size of the original error before calibration and the size of the corrected error after calibration show improvement for every image.

In some embodiments, calibration may be performed using a flexible pattern printed on a flat surface. In this way, the flexible pattern may be generated by any user, including using a printing device. Further, in some embodiments, visible patterns may be used for calibration. Accordingly, in such embodiments, the pattern may be printed with infrared reflective ink, which is not visible in typical lighting conditions.

In some examples, the calibration is not lost when the 3D camera is turned off. Rather, whenever the 3D camera is restarted, the accuracy provided by real-time 3D calibration can be obtained. Once the camera turns on and the mark patterns is in the camera field of view, corrected 3D coordinates of an object can be updated in real-time. Also, some examples can perform dynamic calibration work that obtains accurate 3D coordinates in long time measurement work. With the time going on, the difference between the uncorrected depth value from the camera and the accurate depth value may become larger. In some embodiments, the fitting model can be adjusted, which can map the uncorrected depth value to the calculated baselines based on single frame of information. In this way, the dynamic calibration may perform well during long time measurement work, and the new 3D model of objects can be updated in each frame.

Figure 7:
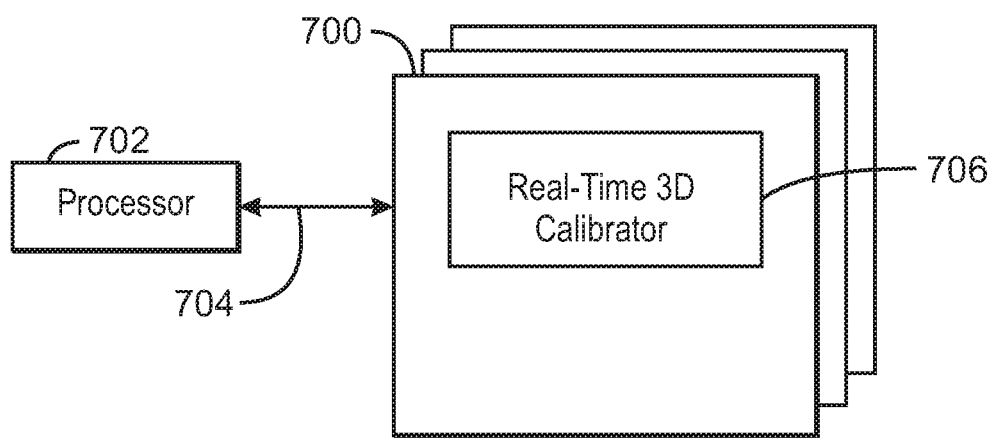
FIG. 7 is a block diagram showing computer readable media that stores code for real-time 3D calibration.

FIG. 7 is a block diagram showing computer readable medium (or media) that store(s) code for real-time 3D calibration. The computer readable media 700 may be accessed by a processor 702 over a computer bus 704. The processor 702 may be any computer processor, graphics processor, or combinations thereof. The computer readable medium 700 may include code configured to direct the processor 702 to perform the methods and embodiments described herein. In some embodiments, the computer readable media 700 may be non-transitory computer readable media. In some examples, the computer readable media 700 may be storage media. However, in any case, the computer readable media do not include transitory media such as carrier waves, signals, and the like.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation.

The various software components discussed herein may be stored on one or more computer readable media 700, as indicated in FIG. 7. For example, a real-time 3d calibrator 706 can perform mark corners detection by mapping the mark corners from 2D points in an image coordinate system to the 3D points in a world coordinate system. In an example implementation, the 3D coordinates of the mark points may be identified in an IR image, and the 3D coordinates may be determined based on the mark corner's pixel coordinates in the original pattern, and printer large scale. Additionally, the real-time 3D calibrator 706 determines a 3D camera parameter matrix, [R|T], which can transform a point from the real-world coordinate system to the camera coordinate system. Further, the real-time 3D calibrator 706 acquires baselines of depth values. In some examples, this includes determining the corrected camera coordinate system location of some proper points on the mark plane. The Z values of these 3D points are the baselines. Also, the real-time 3D calibrator 706 builds the fitting model. In an example, the fitting model is built by mapping the original depth values to the baselines. Further, the real-time calibrator 706 updates the 3D coordinates. This means updating the 3D points to construct the new 3D model of the object. The built fitting model is globally optimized, which means it is adapted to correct a large range of depth values. Accordingly, the depth value of a point that is not even on the mark plane can be updated based on the fitting model. Using the fitting model, the 3D location can also be corrected.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation.

Reference in the specification to "an example", "some examples", "one embodiment", "some embodiments", "an embodiment", etc. of the disclosed subject matter means that a particular feature, structure, or characteristic described in connection with the embodiment or example is included in at least one embodiment or example of the disclosed subject matter. Thus, the phrase "in one embodiment" or "one example" may appear in various places throughout the specification, but the phrase may not necessarily refer to the same embodiment.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, graphics processing units, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

EXAMPLES

Example 1 is a system for real-time three-dimensional (3D) calibration includes a processor detecting mark corners at two-dimensional (2D) coordinates in an image coordinate system of an image of a specified pattern. The processor determines 3D coordinates of the mark corners in a world coordinate system based on the pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. The processor updates a plurality of 3D camera coordinates for an object using the fitting model.

Example 2 is a system for real-time three-dimensional (3D) calibration includes a processor detecting mark corners at two-dimensional (2D) coordinates in an image coordinate system of an image of a specified pattern. The processor determines 3D coordinates of the mark corners in a world coordinate system based on the pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. The processor updates a plurality of 3D camera coordinates for an object using the fitting model. In an example, an image of the object is captured by a 3D camera.

Example 3 is a system for real-time three-dimensional (3D) calibration includes a processor detecting mark corners at two-dimensional (2D) coordinates in an image coordinate system of an image of a specified pattern. The processor determines 3D coordinates of the mark corners in a world coordinate system based on the pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. The processor updates a plurality of 3D camera coordinates for an object using the fitting model. In an example, an image of the object is captured by a 3D camera. In an example, the parameter matrix may be used to transform a coordinate in the world coordinate system to a coordinate in a coordinate system of the 3D camera.

Example 4 is a system for real-time three-dimensional (3D) calibration includes a processor detecting mark corners at two-dimensional (2D) coordinates in an image coordinate system of an image of a specified pattern. The processor determines 3D coordinates of the mark corners in a world coordinate system based on the pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. The processor updates a plurality of 3D camera coordinates for an object using the fitting model. In an example, the fitting model may be used to map the original depth values to the baseline depth values.

Example 5 is a system for real-time three-dimensional (3D) calibration includes a processor detecting mark corners at two-dimensional (2D) coordinates in an image coordinate system of an image of a specified pattern. The processor determines 3D coordinates of the mark corners in a world coordinate system based on the pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. The processor updates a plurality of 3D camera coordinates for an object using the fitting model. The processor updates a plurality of 3D camera coordinates for an object using the fitting model. In an example, the processor generates the image of the specified pattern.

Example 6 is a system for real-time three-dimensional (3D) calibration includes a processor detecting mark corners at two-dimensional (2D) coordinates in an image coordinate system of an image of a specified pattern. The processor determines 3D coordinates of the mark corners in a world coordinate system based on the pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. The processor updates a plurality of 3D camera coordinates for an object using the fitting model. In an example, the processor generates the image of the specified pattern. In an example, the image of the specified pattern is generated using infrared absorptive liquid.

Example 7 is a system for real-time three-dimensional (3D) calibration includes a processor detecting mark corners at two-dimensional (2D) coordinates in an image coordinate system of an image of a specified pattern. The processor determines 3D coordinates of the mark corners in a world coordinate system based on the pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. The processor updates a plurality of 3D camera coordinates for an object using the fitting model. In an example, the processor generates the image of the specified pattern. In an example, the image of the specified pattern is generated using infrared absorptive liquid. In an example, the processor captures a depth image of the image of the specified pattern.

Example 8 is a system for real-time three-dimensional (3D) calibration includes a processor detecting mark corners at two-dimensional (2D) coordinates in an image coordinate system of an image of a specified pattern. The processor determines 3D coordinates of the mark corners in a world coordinate system based on the pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. The processor updates a plurality of 3D camera coordinates for an object using the fitting model. In an example, the processor generates the image of the specified pattern. In an example, the image of the specified pattern is generated using infrared absorptive liquid. In an example, the processor captures a depth image of the image of the specified pattern. In an example, the processor captures an infrared image of the image of the specified pattern.

Example 9 is a system for real-time three-dimensional (3D) calibration includes a processor detecting mark corners at two-dimensional (2D) coordinates in an image coordinate system of an image of a specified pattern. The processor determines 3D coordinates of the mark corners in a world coordinate system based on the pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. The processor updates a plurality of 3D camera coordinates for an object using the fitting model. In an example, the processor generates the image of the specified pattern. In an example, the image of the specified pattern is generated using infrared absorptive liquid. In an example, the processor captures a depth image of the image of the specified pattern. In an example, the processor captures an infrared image of the image of the specified pattern. In an example, the processor determines a relationship between pixels representing detected mark corners in the infrared image and corresponding pixels of the depth image.

Example 10 is a system for real-time three-dimensional (3D) calibration includes a processor detecting mark corners at two-dimensional (2D) coordinates in an image coordinate system of an image of a specified pattern. The processor determines 3D coordinates of the mark corners in a world coordinate system based on the pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. The processor updates a plurality of 3D camera coordinates for an object using the fitting model. In an example, the processor updates a plurality of 3D camera coordinates for an object using the fitting model. An image of the object is captured by a 3D camera. In an example, the processor identifies a line having an optical center of the 3D camera within the camera coordinate system.

Example 11 is a system for real-time three-dimensional (3D) calibration includes a processor detecting mark corners at two-dimensional (2D) coordinates in an image coordinate system of an image of a specified pattern. The processor determines 3D coordinates of the mark corners in a world coordinate system based on the pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. The processor updates a plurality of 3D camera coordinates for an object using the fitting model. In an example, the processor updates a plurality of 3D camera coordinates for an object using the fitting model. An image of the object is captured by a 3D camera. In an example, the processor may be a graphics processor.

Example 12 is a system for real-time three-dimensional (3D) calibration includes a processor detecting mark corners at two-dimensional (2D) coordinates in an image coordinate system of an image of a specified pattern. The processor determines 3D coordinates of the mark corners in a world coordinate system based on the pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. The processor updates a plurality of 3D camera coordinates for an object using the fitting model. In an example, the processor updates a plurality of 3D camera coordinates for an object using the fitting model. An image of the object is captured by a 3D camera. In an example, the mark corners include at least one of a corner of a triangle, an intersection point of two lines, a sharpest corner of a geometric figure, and a symmetric center of a geometric figure.

Example 13 is a method for real-time 3D calibration. The method includes detecting mark corners at corresponding 2D coordinates in an image coordinate system of an image of a specified pattern. The method also includes determining 3D coordinates of the mark corners in a world coordinate system based on the specified pattern. The 3D coordinates correspond to the 2D coordinates. The method additionally includes determining a parameter matrix based on the 2D coordinates and the 3D coordinates. The method further includes determining baseline depth values corresponding to original depth values for proper points on a mark plane, based on the 2D coordinates and the 3D coordinates. Additionally, the method includes generating a fitting model based on the baseline depth values. Also, the method includes updating 3D camera coordinates for an object using the fitting model. An image of the object is captured by a 3D camera.

Example 14 is a method for real-time 3D calibration. The method includes detecting mark corners at corresponding 2D coordinates in an image coordinate system of an image of a specified pattern. The method also includes determining 3D coordinates of the mark corners in a world coordinate system based on the specified pattern. The 3D coordinates correspond to the 2D coordinates. The method further includes determining baseline depth values corresponding to original depth values for proper points on a mark plane, based on the 2D coordinates and the 3D coordinates. Additionally, the method includes generating a fitting model based on the baseline depth values. Also, the method includes updating 3D camera coordinates for an object using the fitting model. An image of the object is captured by a 3D camera. In an example, the method includes generating the image of the specified pattern. The image of the specified pattern is generated using infrared absorptive liquid.

Example 15 is a method for real-time 3D calibration. The method includes detecting mark corners at corresponding 2D coordinates in an image coordinate system of an image of a specified pattern. The method also includes determining 3D coordinates of the mark corners in a world coordinate system based on the specified pattern. The 3D coordinates correspond to the 2D coordinates. The method additionally includes determining a parameter matrix based on the 2D coordinates and the 3D coordinates. The method further includes determining baseline depth values corresponding to original depth values for proper points on a mark plane, based on the 2D coordinates and the 3D coordinates. Additionally, the method includes generating a fitting model based on the baseline depth values. Also, the method includes updating 3D camera coordinates for an object using the fitting model. An image of the object is captured by a 3D camera. In an example, the method includes generating the image of the specified pattern. The image of the specified pattern is generated using infrared absorptive liquid. In an example, the method further includes capturing a depth image of the image of the specified pattern.

Example 16 is a method for real-time 3D calibration. The method includes detecting mark corners at corresponding 2D coordinates in an image coordinate system of an image of a specified pattern. The method also includes determining 3D coordinates of the mark corners in a world coordinate system based on the specified pattern. The 3D coordinates correspond to the 2D coordinates. The method additionally includes determining a parameter matrix based on the 2D coordinates and the 3D coordinates. The method further includes determining baseline depth values corresponding to original depth values for proper points on a mark plane, based on the 2D coordinates and the 3D coordinates. Additionally, the method includes generating a fitting model based on the baseline depth values. Also, the method includes updating 3D camera coordinates for an object using the fitting model. An image of the object is captured by a 3D camera. In an example, the method includes generating the image of the specified pattern. The image of the specified pattern is generated using infrared absorptive liquid. In an example, the method also includes capturing an infrared mage of the image of the specified pattern.

Example 17 is a method for real-time 3D calibration. The method includes detecting mark corners at corresponding 2D coordinates in an image coordinate system of an image of a specified pattern. The method also includes determining 3D coordinates of the mark corners in a world coordinate system based on the specified pattern. The 3D coordinates correspond to the 2D coordinates. The method additionally includes determining a parameter matrix based on the 2D coordinates and the 3D coordinates. The method further includes determining baseline depth values corresponding to original depth values for proper points on a mark plane, based on the 2D coordinates and the 3D coordinates. Additionally, the method includes generating a fitting model based on the baseline depth values. Also, the method includes updating 3D camera coordinates for an object using the fitting model. An image of the object is captured by a 3D camera. In an example, the method includes generating the image of the specified pattern. The image of the specified pattern is generated using infrared absorptive liquid. In an example, the method also includes capturing an infrared mage of the image of the specified pattern. In an example, the method further includes determining a relationship between pixels representing detected mark corners in the infrared image and corresponding pixels of the depth image.

Example 18 is a method for real-time 3D calibration. The method includes detecting mark corners at corresponding 2D coordinates in an image coordinate system of an image of a specified pattern. The method also includes determining 3D coordinates of the mark corners in a world coordinate system based on the specified pattern. The 3D coordinates correspond to the 2D coordinates. The method additionally includes determining a parameter matrix based on the 2D coordinates and the 3D coordinates. The method further includes determining baseline depth values corresponding to original depth values for proper points on a mark plane, based on the 2D coordinates and the 3D coordinates. Additionally, the method includes generating a fitting model based on the baseline depth values. Also, the method includes updating 3D camera coordinates for an object using the fitting model. An image of the object is captured by a 3D camera. In an example, the method includes identifying a line having an optical center of the 3D camera within the camera coordinate system.

Example 19 is a tangible, non-transitory computer readable medium for real-time 3D calibration, including instructions that, in response to being executed on a processor, cause the processor to detect mark corners at corresponding 2D coordinates in an image coordinate system of an image of a specified pattern. The instructions also cause the processor to determine 3D coordinates of the mark corners in a world coordinate system based on the specified pattern. The 3D coordinates correspond to the 2D coordinates. The instructions further cause the processor to determine baseline depth values corresponding to original depth values for proper points on a mark plane, based on the 2D coordinates and the 3D coordinates. Also, the instructions cause the processor to generate a fitting model based on the baseline depth values. Further, the instructions cause the processor to update 3D camera coordinates for an object using the fitting model. An image of the object is captured by a 3D camera.

Example 20 is a tangible, non-transitory computer readable medium for real-time 3D calibration, including instructions that, in response to being executed on a processor, cause the processor to detect mark corners at corresponding 2D coordinates in an image coordinate system of an image of a specified pattern. The instructions also cause the processor to determine 3D coordinates of the mark corners in a world coordinate system based on the specified pattern. The 3D coordinates correspond to the 2D coordinates. The instructions further cause the processor to determine baseline depth values corresponding to original depth values for proper points on a mark plane, based on the 2D coordinates and the 3D coordinates. Also, the instructions cause the processor to generate a fitting model based on the baseline depth values. Further, the instructions cause the processor to update 3D camera coordinates for an object using the fitting model. An image of the object is captured by a 3D camera. In an example, the instructions cause the processor to generate the image of the specified pattern. The image of the specified pattern is generated using infrared absorptive liquid. Additionally, the instructions cause the processor to capture an infrared image of the image of the specified pattern.

Example 22 is a tangible, non-transitory computer readable medium for real-time 3D calibration, including instructions that, in response to being executed on a processor, cause the processor to detect mark corners at corresponding 2D coordinates in an image coordinate system of an image of a specified pattern. The instructions also cause the processor to determine 3D coordinates of the mark corners in a world coordinate system based on the specified pattern. The 3D coordinates correspond to the 2D coordinates. The instructions further cause the processor to determine baseline depth values corresponding to original depth values for proper points on a mark plane, based on the 2D coordinates and the 3D coordinates. Also, the instructions cause the processor to generate a fitting model based on the baseline depth values. Further, the instructions cause the processor to update 3D camera coordinates for an object using the fitting model. An image of the object is captured by a 3D camera. In an example, the instructions cause the processor to capture a depth image of the image of the specified pattern.

Example 23 is a tangible, non-transitory computer readable medium for real-time 3D calibration, including instructions that, in response to being executed on a processor, cause the processor to detect mark corners at corresponding 2D coordinates in an image coordinate system of an image of a specified pattern. The instructions also cause the processor to determine 3D coordinates of the mark corners in a world coordinate system based on the specified pattern. The 3D coordinates correspond to the 2D coordinates. The instructions further cause the processor to determine baseline depth values corresponding to original depth values for proper points on a mark plane, based on the 2D coordinates and the 3D coordinates. Also, the instructions cause the processor to generate a fitting model based on the baseline depth values. Further, the instructions cause the processor to update 3D camera coordinates for an object using the fitting model. An image of the object is captured by a 3D camera. In an example, the instructions cause the processor to capture a depth image of the image of the specified pattern. In an example, the instructions cause the processor to determine a relationship between pixels representing detected mark corners in the infrared image and corresponding pixels of the depth image. The mark corners are detected by identifying a mark point of the specified pattern that has a smaller angle than remaining angles of the pattern.

Example 24 is a system for real-time 3D calibration. The system includes means to detect a plurality of mark corners at corresponding 2D coordinates in an image coordinate system of an image of a specified pattern. The system also includes means to determine 3D coordinates of the mark corners in a world coordinate system based on the specified pattern. The 3D coordinates correspond to the 2D coordinates. The system further includes means to determine baseline depth values corresponding to original depth values for proper points on a mark plane, based on the 2D coordinates and the 3D coordinates. Also the system includes means to generate a fitting model based on the baseline depth values. Additionally, the system includes means to update 3D camera coordinates for an object using the fitting model. An image of the object is captured by a 3D camera.

Example 25 is a system for real-time 3D calibration. The system includes means to detect a plurality of mark corners at corresponding 2D coordinates in an image coordinate system of an image of a specified pattern. The system also includes means to determine 3D coordinates of the mark corners in a world coordinate system based on the specified pattern. The 3D coordinates correspond to the 2D coordinates. The system further includes means to determine baseline depth values corresponding to original depth values for proper points on a mark plane, based on the 2D coordinates and the 3D coordinates. Also the system includes means to generate a fitting model based on the baseline depth values. Additionally, the system includes means to update 3D camera coordinates for an object using the fitting model. An image of the object is captured by a 3D camera. In an example, the mark corners include at least one of a corner of a triangle, an intersection point of two lines, a sharpest corner of a geometric figure, and a symmetric center of a geometric figure.

Example 26 is a system for real-time 3D calibration, having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor additionally determines baseline depth values corresponding to original depth values for proper points on a mark plane, based on the 2D coordinates and the 3D coordinates. Also, the processor generates a fitting model based on the baseline depth values. Further, the processor updates 3D camera coordinates for an object using the fitting model.

Example 27 is a system for real-time 3D calibration, having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor additionally determines baseline depth values corresponding to original depth values for proper points on a mark plane, based on the 2D coordinates and the 3D coordinates. Also, the processor generates a fitting model based on the baseline depth values. Further, the processor updates 3D camera coordinates for an object using the fitting model. An image of the object is captured by a 3D camera.

Example 28 is a system for real-time 3D calibration, having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor also determines a parameter matrix based on the 2D coordinates and the 3D coordinates. The processor additionally determines baseline depth values corresponding to original depth values for proper points on a mark plane, based on the 2D coordinates and the 3D coordinates. Also, the processor generates a fitting model based on the baseline depth values. Additionally, the processor updates 3D camera coordinates for an object using the fitting model. An image of the object is captured by a 3D camera. In an example, the processor determines a parameter matrix based on the 2D coordinates and the 3D coordinates. In an example, the parameter matrix may be used to transform a coordinate in the world coordinate system to a coordinate in a coordinate system of the 3D camera.

Example 29 is a system for real-time 3D calibration, having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor additionally determines baseline depth values corresponding to original depth values for proper points on a mark plane, based on the 2D coordinates and the 3D coordinates. Also, the processor generates a fitting model based on the baseline depth values. Additionally, the processor updates 3D camera coordinates for an object using the fitting model. An image of the object is captured by a 3D camera. In an example, the fitting model may be used to map the original depth values to the baseline depth values.

Example 30 is a system for real-time 3D calibration, having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor additionally determines baseline depth values corresponding to original depth values for proper points on a mark plane, based on the 2D coordinates and the 3D coordinates. Also, the processor generates a fitting model based on the baseline depth values.

Additionally, the processor updates 3D camera coordinates for an object using the fitting model. An image of the object is captured by a 3D camera. In an example, the processor generates the image of the specified pattern.

Example 31 is a system for real-time 3D calibration, having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor additionally determines baseline depth values corresponding to original depth values for proper points on a mark plane, based on the 2D coordinates and the 3D coordinates. Also, the processor generates a fitting model based on the baseline depth values. Additionally, the processor updates 3D camera coordinates for an object using the fitting model. An image of the object is captured by a 3D camera. In an example, the processor generates the image of the specified pattern. In an example, the image of the specified pattern is generated using infrared absorptive liquid.

Example 32 is a system for real-time 3D calibration, having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor additionally determines baseline depth values corresponding to original depth values for proper points on a mark plane, based on the 2D coordinates and the 3D coordinates. Also, the processor generates a fitting model based on the baseline depth values. Additionally, the processor updates 3D camera coordinates for an object using the fitting model. An image of the object is captured by a 3D camera. In an example, the processor generates the image of the specified pattern. In an example, the image of the specified pattern is generated using infrared absorptive liquid. In an example, the processor captures a depth image of the image of the specified pattern.

Example 33 is a system for real-time 3D calibration, having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor additionally determines baseline depth values corresponding to original depth values for proper points on a mark plane, based on the 2D coordinates and the 3D coordinates. Also, the processor generates a fitting model based on the baseline depth values. Additionally, the processor updates 3D camera coordinates for an object using the fitting model. An image of the object is captured by a 3D camera. In an example, the processor generates the image of the specified pattern. In an example, the image of the specified pattern is generated using infrared absorptive liquid. In an example, the processor captures a depth image of the image of the specified pattern. In an example, the processor captures an infrared image of the image of the specified pattern.

Example 34 is a system for real-time 3D calibration, having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor additionally determines baseline depth values corresponding to original depth values for proper points on a mark plane, based on the 2D coordinates and the 3D coordinates. Also, the processor generates a fitting model based on the baseline depth values. Additionally, the processor updates 3D camera coordinates for an object using the fitting model. An image of the object is captured by a 3D camera. In an example, the processor generates the image of the specified pattern. In an example, the image of the specified pattern is generated using infrared absorptive liquid. In an example, the processor captures a depth image of the image of the specified pattern. In an example, the processor captures an infrared image of the image of the specified pattern. In an example, the processor determines a relationship between pixels representing detected mark corners in the infrared image and corresponding pixels of the depth image.

Example 35 is a system for real-time 3D calibration, having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor additionally determines baseline depth values corresponding to original depth values for proper points on a mark plane, based on the 2D coordinates and the 3D coordinates. Also, the processor generates a fitting model based on the baseline depth values. Additionally, the processor updates 3D camera coordinates for an object using the fitting model. An image of the object is captured by a 3D camera. In an example, the processor identifies a line having an optical center of the 3D camera within the camera coordinate system.

Example 36 is a system for real-time 3D calibration, having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor additionally determines baseline depth values corresponding to original depth values for proper points on a mark plane, based on the 2D coordinates and the 3D coordinates. Also, the processor generates a fitting model based on the baseline depth values. Additionally, the processor updates 3D camera coordinates for an object using the fitting model. An image of the object is captured by a 3D camera. In an example, the processor includes a graphics processor.

Example 37 is a system for real-time 3D calibration, having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor additionally determines baseline depth values corresponding to original depth values for proper points on a mark plane, based on the 2D coordinates and the 3D coordinates. Also, the processor generates a fitting model based on the baseline depth values. Additionally, the processor updates 3D camera coordinates for an object using the fitting model. An image of the object is captured by a 3D camera. In an example, the mark corners include at least one of a corner of a triangle, an intersection point of two lines, a sharpest corner of a geometric figure, and a symmetric center of a geometric figure.

Example 38 is a method for real-time 3D calibration. The method includes detecting mark corners at corresponding 2D coordinates in an image coordinate system of an image of a specified pattern. The method also includes determining 3D coordinates of the mark corners in a world coordinate system based on the specified pattern. The 3D coordinates correspond to the 2D coordinates. The method further includes determining baseline depth values corresponding to original depth values for proper points on a mark plane, based on the 2D coordinates and the 3D coordinates. Also, the method includes generating a fitting model based on the baseline depth values. Additionally, the method includes updating 3D camera coordinates for an object using the fitting model. An image of the object is captured by a 3D camera.

Example 39 is a method for real-time 3D calibration. The method includes detecting mark corners at corresponding 2D coordinates in an image coordinate system of an image of a specified pattern. The method also includes determining 3D coordinates of the mark corners in a world coordinate system based on the specified pattern. The 3D coordinates correspond to the 2D coordinates. The method further includes determining baseline depth values corresponding to original depth values for proper points on a mark plane, based on the 2D coordinates and the 3D coordinates. Also, the method includes generating a fitting model based on the baseline depth values. Additionally, the method includes updating 3D camera coordinates for an object using the fitting model. An image of the object is captured by a 3D camera. In an example, the method includes generating the image of the specified pattern. The image of the specified pattern is generated using infrared absorptive liquid.

Example 40 is a method for real-time 3D calibration. The method includes detecting mark corners at corresponding 2D coordinates in an image coordinate system of an image of a specified pattern. The method also includes determining 3D coordinates of the mark corners in a world coordinate system based on the specified pattern. The 3D coordinates correspond to the 2D coordinates. The method additionally includes determining a parameter matrix based on the 2D coordinates and the 3D coordinates. The method further includes determining baseline depth values corresponding to original depth values for proper points on a mark plane, based on the 2D coordinates and the 3D coordinates. Also, the method includes generating a fitting model based on the baseline depth values. Additionally, the method includes updating 3D camera coordinates for an object using the fitting model. An image of the object is captured by a 3D camera. In an example, the method includes capturing a depth image of the image of the specified pattern.

Example 41 is a method for real-time 3D calibration. The method includes detecting mark corners at corresponding 2D coordinates in an image coordinate system of an image of a specified pattern. The method also includes determining 3D coordinates of the mark corners in a world coordinate system based on the specified pattern. The 3D coordinates correspond to the 2D coordinates. The method further includes determining baseline depth values corresponding to original depth values for proper points on a mark plane, based on the 2D coordinates and the 3D coordinates. Also, the method includes generating a fitting model based on the baseline depth values. Additionally, the method includes updating 3D camera coordinates for an object using the fitting model. An image of the object is captured by a 3D camera. In an example, the method includes generating the image of the specified pattern. The image of the specified pattern is generated using infrared absorptive liquid. In an example, the method includes capturing an infrared image of the image of the specified pattern.

Example 42 is a method for real-time 3D calibration. The method includes detecting mark corners at corresponding 2D coordinates in an image coordinate system of an image of a specified pattern. The method also includes determining 3D coordinates of the mark corners in a world coordinate system based on the specified pattern. The 3D coordinates correspond to the 2D coordinates. The method further includes determining baseline depth values corresponding to original depth values for proper points on a mark plane, based on the 2D coordinates and the 3D coordinates. Also, the method includes generating a fitting model based on the baseline depth values. Additionally, the method includes updating 3D camera coordinates for an object using the fitting model. An image of the object is captured by a 3D camera. In an example, the method includes generating the image of the specified pattern. The image of the specified pattern is generated using infrared absorptive liquid. In an example, the method includes capturing an infrared image of the image of the specified pattern. In an example, the method includes determining a relationship between pixels representing detected mark corners in the infrared image and corresponding pixels of the depth image.

Example 43 is a method for real-time 3D calibration. The method includes detecting mark corners at corresponding 2D coordinates in an image coordinate system of an image of a specified pattern. The method also includes determining 3D coordinates of the mark corners in a world coordinate system based on the specified pattern. The 3D coordinates correspond to the 2D coordinates. The method further includes determining baseline depth values corresponding to original depth values for proper points on a mark plane, based on the 2D coordinates and the 3D coordinates. Also, the method includes generating a fitting model based on the baseline depth values. Additionally, the method includes updating 3D camera coordinates for an object using the fitting model. An image of the object is captured by a 3D camera. In an example, the method includes identifying a line having an optical center of the 3D camera within the camera coordinate system.

Example 44 is a tangible, non-transitory computer readable medium for real-time 3D calibration, having instructions that, in response to being executed on a processor, cause the processor to detect mark corners at corresponding 2D coordinates in an image coordinate system of an image of a specified pattern. The instructions also cause the processor to determine 3D coordinates of the mark corners in a world coordinate system based on the specified pattern. The 3D coordinates correspond to the 2D coordinates. Also, the instructions cause the processor to determine baseline depth values corresponding to original depth values for proper points on a mark plane, based on the 2D coordinates and the 3D coordinates. Additionally, the instructions cause the processor to generate a fitting model based on the baseline depth values. Further, the instructions cause the processor to update a plurality of 3D camera coordinates of an object using the fitting model.

Example 45 is a tangible, non-transitory computer readable medium for real-time 3D calibration, having instructions that, in response to being executed on a processor, cause the processor to detect mark corners at corresponding 2D coordinates in an image coordinate system of an image of a specified pattern. The instructions also cause the processor to determine 3D coordinates of the mark corners in a world coordinate system based on the specified pattern. The 3D coordinates correspond to the 2D coordinates. Also, the instructions cause the processor to determine baseline depth values corresponding to original depth values for proper points on a mark plane, based on the 2D coordinates and the 3D coordinates. Additionally, the instructions cause the processor to generate a fitting model based on the baseline depth values. Further, the instructions cause the processor to update 3D camera coordinates for an object using the fitting model. In an example, an image of the object is captured by a 3D camera.

Example 46 is a tangible, non-transitory computer readable medium for real-time 3D calibration, having instructions that, in response to being executed on a processor, cause the processor to detect mark corners at corresponding 2D coordinates in an image coordinate system of an image of a specified pattern. The instructions also cause the processor to determine 3D coordinates of the mark corners in a world coordinate system based on the specified pattern. The 3D coordinates correspond to the 2D coordinates. Also, the instructions cause the processor to determine baseline depth values corresponding to original depth values for proper points on a mark plane, based on the 2D coordinates and the 3D coordinates. Additionally, the instructions cause the processor to generate a fitting model based on the baseline depth values. Further, the instructions cause the processor to update a plurality of 3D camera coordinates of an object using the fitting model. An image of the object is captured by a 3D camera. In an example, the instructions cause the processor to generate the image of the specified pattern. The image of the specified pattern is generated using infrared absorptive liquid. The instructions cause the processor to capture an infrared image of the image of the specified pattern.

Example 47 is a tangible, non-transitory computer readable medium for real-time 3D calibration, having instructions that, in response to being executed on a processor, cause the processor to detect mark corners at corresponding 2D coordinates in an image coordinate system of an image of a specified pattern. The instructions also cause the processor to determine 3D coordinates of the mark corners in a world coordinate system based on the specified pattern. The 3D coordinates correspond to the 2D coordinates. Also, the instructions cause the processor to determine baseline depth values corresponding to original depth values for proper points on a mark plane, based on the 2D coordinates and the 3D coordinates. Additionally, the instructions cause the processor to generate a fitting model based on the baseline depth values. Further, the instructions cause the processor to update a plurality of 3D camera coordinates of an object using the fitting model. An image of the object is captured by a 3D camera. In an example, the instructions cause the processor to capture a depth image of the image of the specified pattern.

Example 48 is a tangible, non-transitory computer readable medium for real-time 3D calibration, having instructions that, in response to being executed on a processor, cause the processor to detect mark corners at corresponding 2D coordinates in an image coordinate system of an image of a specified pattern. The instructions also cause the processor to determine 3D coordinates of the mark corners in a world coordinate system based on the specified pattern. The 3D coordinates correspond to the 2D coordinates. Also, the instructions cause the processor to determine baseline depth values corresponding to original depth values for proper points on a mark plane, based on the 2D coordinates and the 3D coordinates. Additionally, the instructions cause the processor to generate a fitting model based on the baseline depth values. Further, the instructions cause the processor to update a plurality of 3D camera coordinates of an object using the fitting model. An image of the object is captured by a 3D camera. In an example, the instructions cause the processor to capture a depth image of the image of the specified pattern. In an example, the instructions cause the processor to determine a relationship between pixels representing detected mark corners in the infrared image and corresponding pixels of the depth image. The mark corners are detected by identifying a mark point of the specified pattern that has a smaller angle than remaining angles of the pattern.

Example 49 is a system for real-time 3D calibration. The system includes means to detect mark corners at corresponding 2D coordinates in an image coordinate system of an image of a specified pattern. The system also includes means to determine 3D coordinates of the mark corners in a world coordinate system based on the specified pattern. The 3D coordinates correspond to the 2D coordinates. The system further includes means to determine baseline depth values corresponding to original depth values for proper points on a mark plane, based on the 2D coordinates and the 3D coordinates. Also, the system includes means to generate a fitting model based on the baseline depth values. Further, the system includes means to update a plurality of 3D camera coordinates of an object using the fitting model. An image of the object is captured by a 3D camera.

Example 50 is a system for real-time 3D calibration. The system includes means to detect mark corners at corresponding 2D coordinates in an image coordinate system of an image of a specified pattern. The system also includes means to determine 3D coordinates of the mark corners in a world coordinate system based on the specified pattern. The 3D coordinates correspond to the 2D coordinates. The system further includes means to determine baseline depth values corresponding to original depth values for proper points on a mark plane, based on the 2D coordinates and the 3D coordinates. Also, the system includes means to generate a fitting model based on the baseline depth values. Further, the system includes means to update a plurality of 3D camera coordinates of an object using the fitting model. An image of the object is captured by a 3D camera. The mark corners include at least one of a corner of a triangle, an intersection point of two lines, a sharpest corner of a geometric figure, and a symmetric center of a geometric figure.

Example 51 is a system for real-time 3D calibration. The system includes a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor further determines baseline depth values corresponding to original depth values for proper points on a mark plane, based on the 2D coordinates and the 3D coordinates. Also, the processor generates a fitting model based on the baseline depth values. Further, the system includes means to update a plurality of 3D camera coordinates of an object using the fitting model. An image of the object is captured by a 3D camera.

Example 52 is a system for real-time 3D calibration. The system includes a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor further determines baseline depth values corresponding to original depth values for proper points on a mark plane, based on the 2D coordinates and the 3D coordinates. Also, the processor generates a fitting model based on the baseline depth values. Further, the processor updates a plurality of 3D camera coordinates of an object using the fitting model. An image of the object is captured by a 3D camera. In an example, the processor updates 3D camera coordinates for an object using the fitting model. An image of the object is captured by a 3D camera.

Example 53 is a system for real-time 3D calibration. The system includes a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor further determines baseline depth values corresponding to original depth values for proper points on a mark plane, based on the 2D coordinates and the 3D coordinates. Also, the processor generates a fitting model based on the baseline depth values. Additionally, the processor updates 3D camera coordinates for an object using the fitting model. An image of the object is captured by a 3D camera. In an example, the processor determines a parameter matrix based on the 2D coordinates and the 3D coordinates. The parameter matrix may be used to transform a coordinate in the world coordinate system to a coordinate in a coordinate system of the 3D camera.

Example 54 is a system for real-time 3D calibration. The system includes a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor further determines baseline depth values corresponding to original depth values for proper points on a mark plane, based on the 2D coordinates and the 3D coordinates. Also, the processor generates a fitting model based on the baseline depth values. The fitting model may be used to map the original depth values to the baseline depth values. Further, the processor updates a plurality of 3D camera coordinates of an object using the fitting model. An image of the object is captured by a 3D camera.

Example 55 is a system for real-time 3D calibration. The system includes a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor further determines baseline depth values corresponding to original depth values for proper points on a mark plane, based on the 2D coordinates and the 3D coordinates. Also, the processor generates a fitting model based on the baseline depth values. Further, the processor updates a plurality of 3D camera coordinates of an object using the fitting model. An image of the object is captured by a 3D camera. Additionally, the processor generates the image of the specified pattern.

Example 56 is a system for real-time 3D calibration. The system includes a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor also determines a parameter matrix based on the 2D coordinates and the 3D coordinates. The processor further determines baseline depth values corresponding to original depth values for proper points on a mark plane, based on the 2D coordinates and the 3D coordinates. Also, the processor generates a fitting model based on the baseline depth values. Further, the processor updates a plurality of 3D camera coordinates of an object using the fitting model. An image of the object is captured by a 3D camera. In an example, the processor generates the image of the specified pattern. The image of the specified pattern is generated using infrared absorptive liquid.

Example 57 is a system for real-time 3D calibration. The system includes a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor further determines baseline depth values corresponding to original depth values for proper points on a mark plane, based on the 2D coordinates and the 3D coordinates. Also, the processor generates a fitting model based on the baseline depth values. Further, the processor updates a plurality of 3D camera coordinates of an object using the fitting model. An image of the object is captured by a 3D camera. In an example, the processor generates the image of the specified pattern. The image of the specified pattern is generated using infrared absorptive liquid. In an example, the processor captures a depth image of the image of the specified pattern.

Example 58 is a system for real-time 3D calibration. The system includes a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor further determines baseline depth values corresponding to original depth values for proper points on a mark plane, based on the 2D coordinates and the 3D coordinates. Also, the processor generates a fitting model based on the baseline depth values. Further, the processor updates a plurality of 3D camera coordinates of an object using the fitting model. An image of the object is captured by a 3D camera. In an example, the processor generates the image of the specified pattern. The image of the specified pattern is generated using infrared absorptive liquid. In an example, the processor captures a depth image of the image of the specified pattern. In an example, the processor captures an infrared image of the image of the specified pattern.

Example 59 is a system for real-time 3D calibration. The system includes a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor further determines baseline depth values corresponding to original depth values for proper points on a mark plane, based on the 2D coordinates and the 3D coordinates. Also, the processor generates a fitting model based on the baseline depth values. Further, the processor updates a plurality of 3D camera coordinates of an object using the fitting model. An image of the object is captured by a 3D camera. In an example, the processor generates the image of the specified pattern. The image of the specified pattern is generated using infrared absorptive liquid. In an example, the processor captures a depth image of the image of the specified pattern. In an example, the processor captures an infrared image of the image of the specified pattern. In an example, the processor determines a relationship between pixels representing detected mark corners in the infrared image and corresponding pixels of the depth image.

Example 60 is a system for real-time 3D calibration. The system includes a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor further determines baseline depth values corresponding to original depth values for proper points on a mark plane, based on the 2D coordinates and the 3D coordinates. Also, the processor generates a fitting model based on the baseline depth values. Further, the processor updates 3D camera coordinates for an object using the fitting model. An image of the object is captured by a 3D camera. In an example, the processor identifies a line having an optical center of the 3D camera within the camera coordinate system.

Example 61 is a system for real-time 3D calibration. The system includes a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor further determines baseline depth values corresponding to original depth values for proper points on a mark plane, based on the 2D coordinates and the 3D coordinates. Also, the processor generates a fitting model based on the baseline depth values. Further, the processor updates 3D camera coordinates for an object using the fitting model. An image of the object is captured by a 3D camera. In an example, the processor includes a graphics processor.

Example 62 is a system for real-time 3D calibration. The system includes a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor further determines baseline depth values corresponding to original depth values for proper points on a mark plane, based on the 2D coordinates and the 3D coordinates. Also, the processor generates a fitting model based on the baseline depth values. Further, the processor updates 3D camera coordinates for an object using the fitting model. An image of the object is captured by a 3D camera. In an example, the mark corners include at least one of a corner of a triangle, an intersection point of two lines, a sharpest corner of a geometric figure, and a symmetric center of a geometric figure.

Example 63 is a method for real-time 3D calibration. The method includes detecting mark corners at corresponding 2D coordinates in an image coordinate system of an image of a specified pattern. The method also includes determining 3D coordinates of the mark corners in a world coordinate system based on the specified pattern. The 3D coordinates correspond to the 2D coordinates. The method additionally includes determining a parameter matrix based on the 2D coordinates and the 3D coordinates. The method further includes determining baseline depth values corresponding to original depth values for proper points on a mark plane, based on the 2D coordinates and the 3D coordinates. Also, the method includes generating a fitting model based on the baseline depth values. Further, the method includes updating 3D camera coordinates for an object using the fitting model. An image of the object is captured by a 3D camera.

Example 64 is a method for real-time 3D calibration. The method includes detecting mark corners at corresponding 2D coordinates in an image coordinate system of an image of a specified pattern. The method also includes determining 3D coordinates of the mark corners in a world coordinate system based on the specified pattern. The 3D coordinates correspond to the 2D coordinates. The method further includes determining baseline depth values corresponding to original depth values for proper points on a mark plane, based on the 2D coordinates and the 3D coordinates. Also, the method includes generating a fitting model based on the baseline depth values. Further, the method includes updating 3D camera coordinates for an object using the fitting model. An image of the object is captured by a 3D camera. In an example, the method includes generating the image of the specified pattern. The image of the specified pattern is generated using infrared absorptive liquid.

Example 65 is a method for real-time 3D calibration. The method includes detecting mark corners at corresponding 2D coordinates in an image coordinate system of an image of a specified pattern. The method also includes determining 3D coordinates of the mark corners in a world coordinate system based on the specified pattern. The 3D coordinates correspond to the 2D coordinates. The method further includes determining baseline depth values corresponding to original depth values for proper points on a mark plane, based on the 2D coordinates and the 3D coordinates. Also, the method includes generating a fitting model based on the baseline depth values. Further, the method includes updating 3D camera coordinates for an object using the fitting model. An image of the object is captured by a 3D camera. In an example, the method includes generating the image of the specified pattern. The image of the specified pattern is generated using infrared absorptive liquid. In an example, the method also includes capturing a depth image of the image of the specified pattern.

Example 66 is a method for real-time 3D calibration. The method includes detecting mark corners at corresponding 2D coordinates in an image coordinate system of an image of a specified pattern. The method also includes determining 3D coordinates of the mark corners in a world coordinate system based on the specified pattern. The 3D coordinates correspond to the 2D coordinates. The method further includes determining baseline depth values corresponding to original depth values for proper points on a mark plane, based on the 2D coordinates and the 3D coordinates. Also, the method includes generating a fitting model based on the baseline depth values. Further, the method includes updating 3D camera coordinates for an object using the fitting model. An image of the object is captured by a 3D camera. In an example, the method includes generating the image of the specified pattern. The image of the specified pattern is generated using infrared absorptive liquid. In an example, the method additionally includes capturing an infrared image of the image of the specified pattern.

Example 67 is a method for real-time 3D calibration. The method includes detecting mark corners at corresponding 2D coordinates in an image coordinate system of an image of a specified pattern. The method also includes determining 3D coordinates of the mark corners in a world coordinate system based on the specified pattern. The 3D coordinates correspond to the 2D coordinates. The method further includes determining baseline depth values corresponding to original depth values for proper points on a mark plane, based on the 2D coordinates and the 3D coordinates. Also, the method includes generating a fitting model based on the baseline depth values. Further, the method includes updating 3D camera coordinates for an object using the fitting model. An image of the object is captured by a 3D camera. In an example, the method includes generating the image of the specified pattern. The image of the specified pattern is generated using infrared absorptive liquid. In an example, the method additionally includes capturing an infrared image of the image of the specified pattern. In an example, the method includes determining a relationship between pixels representing detected mark corners in the infrared image and corresponding pixels of the depth image.

Example 68 is a method for real-time 3D calibration. The method includes detecting mark corners at corresponding 2D coordinates in an image coordinate system of an image of a specified pattern. The method also includes determining 3D coordinates of the mark corners in a world coordinate system based on the specified pattern. The 3D coordinates correspond to the 2D coordinates. The method further includes determining baseline depth values corresponding to original depth values for proper points on a mark plane, based on the 2D coordinates and the 3D coordinates. Also, the method includes generating a fitting model based on the baseline depth values. Further, the method includes updating 3D camera coordinates for an object using the fitting model. An image of the object is captured by a 3D camera. In an example, the method includes identifying a line having an optical center of the 3D camera within the camera coordinate system.

Example 69 is a system for real-time 3D calibration having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. Further, the processor updates a plurality of 3D camera coordinates of an object using the fitting model. An image of the object is captured by a 3D camera.

Example 70 is a system for real-time 3D calibration having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. Further, the processor updates 3D camera coordinates for an object using the fitting model. In an example, an image of the object is captured by a 3D camera.

Example 71 is a system for real-time 3D calibration having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. In an example, the processor determines a parameter matrix based on the 2D coordinates and the 3D coordinates. In an example, the parameter matrix may be used to transform a coordinate in the world coordinate system to a coordinate in a coordinate system of the 3D camera.

Example 72 is a system for real-time 3D calibration having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. Further, the processor updates a plurality of 3D camera coordinates of an object using the fitting model. An image of the object is captured by a 3D camera. In an example, the fitting model may be used to map the original depth values to the baseline depth values.

Example 73 is a system for real-time 3D calibration having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. Further, the processor updates a plurality of 3D camera coordinates of an object using the fitting model. An image of the object is captured by a 3D camera. In an example, the processor generates the image of the specified pattern.

Example 74 is a system for real-time 3D calibration having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. Further, the processor updates a plurality of 3D camera coordinates of an object using the fitting model. An image of the object is captured by a 3D camera. In an example, the processor generates the image of the specified pattern. In an example, the image of the specified pattern is generated using infrared absorptive liquid.

Example 75 is a system for real-time 3D calibration having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. Further, the processor updates a plurality of 3D camera coordinates of an object using the fitting model. An image of the object is captured by a 3D camera. In an example, the processor generates the image of the specified pattern. In an example, the processor captures a depth image of the image of the specified pattern.

Example 76 is a system for real-time 3D calibration having a processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. Further, the processor updates a plurality of 3D camera coordinates of an object using the fitting model. An image of the object is captured by a 3D camera. In an example, the processor generates the image of the specified pattern. In an example, the processor captures a depth image of the image of the specified pattern. In an example, the processor captures an infrared image of the image of the specified pattern.

Example 77 is a tangible, non-transitory computer readable medium for real-time 3D calibration, having instructions that, in response to being executed on a processor, cause the processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. Further, the processor updates a plurality of 3D camera coordinates of an object using the fitting model. An image of the object is captured by a 3D camera.

Example 78 is a tangible, non-transitory computer readable medium for real-time 3D calibration, having instructions that, in response to being executed on a processor, cause the processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. Further, the processor updates 3D camera coordinates for an object using the fitting model. An image of the object is captured by a 3D camera.

Example 79 is a tangible, non-transitory computer readable medium for real-time 3D calibration, having instructions that, in response to being executed on a processor, cause the processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. Further, the processor updates a plurality of 3D camera coordinates of an object using the fitting model. An image of the object is captured by a 3D camera. In an example, the processor generates the image of the specified pattern. The image of the specified pattern is generated using infrared absorptive liquid. The processor captures an infrared image of the image of the specified pattern.

Example 80 is a tangible, non-transitory computer readable medium for real-time 3D calibration, having instructions that, in response to being executed on a processor, cause the processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. Further, the processor updates a plurality of 3D camera coordinates of an object using the fitting model. An image of the object is captured by a 3D camera. In an example, the processor captures a depth image of the image of the specified pattern.

Example 81 is a tangible, non-transitory computer readable medium for real-time 3D calibration, having instructions that, in response to being executed on a processor, cause the processor to detect mark corners at corresponding 2D coordinates in an image coordinate system of an image of a specified pattern. The processor determines 3D coordinates of the mark corners in a world coordinate system based on the specified pattern. The 3D coordinates correspond to the 2D coordinates. The processor determines baseline depth values corresponding to original depth values for proper points on a mark plane, based on the 2D coordinates and the 3D coordinates. The processor generates a fitting model based on the baseline depth values. Further, the processor updates a plurality of 3D camera coordinates of an object using the fitting model. An image of the object is captured by a 3D camera. In an example, the processor captures a depth image of the image of the specified pattern. In an example, the processor determines a relationship between pixels representing detected mark corners in the infrared image and corresponding pixels of the depth image. The mark corners are detected by identifying a mark point of the specified pattern that has a smaller angle than remaining angles of the pattern.

Example 82 is a system for real-time 3D calibration. The system includes means to detect mark corners at corresponding 2D coordinates in an image coordinate system of an image of a specified pattern. The system also includes means to determine 3D coordinates of the mark corners in a world coordinate system based on the specified pattern. The 3D coordinates correspond to the 2D coordinates. The system additionally includes means to determine a parameter matrix based on the 2D coordinates and the 3D coordinates. The system further includes means to determine baseline depth values corresponding to original depth values for proper points on a mark plane, based on the 2D coordinates and the 3D coordinates. Also, the system includes means to generate a fitting model based on the baseline depth values. Further, the system includes means to update a plurality of 3D camera coordinates of an object using the fitting model. An image of the object is captured by a 3D camera.

Example 83 is a system for real-time 3D calibration. The system includes means to detect mark corners at corresponding 2D coordinates in an image coordinate system of an image of a specified pattern. The system also includes means to determine 3D coordinates of the mark corners in a world coordinate system based on the specified pattern. The 3D coordinates correspond to the 2D coordinates. The system additionally includes means to determine a parameter matrix based on the 2D coordinates and the 3D coordinates. The system further includes means to determine baseline depth values corresponding to original depth values for proper points on a mark plane, based on the 2D coordinates and the 3D coordinates. Also, the system includes means to generate a fitting model based on the baseline depth values. Further, the system includes means to update 3D camera coordinates for an object using the fitting model. An image of the object is captured by a 3D camera. The mark corners include at least one of a corner of a triangle, an intersection point of two lines, a sharpest corner of a geometric figure, and a symmetric center of a geometric figure.

What is claimed is:

1. A system for real-time three-dimensional (3D) calibration, comprising:
a processor to:
detect a plurality of mark corners at a corresponding plurality of two-dimensional (2D) coordinates in an image coordinate system (2D coordinates) of an image of a specified pattern;
determine a plurality of 3D coordinates of the mark corners in a world coordinate system (3D coordinates) based on the specified pattern, wherein the 3D coordinates correspond to the 2D coordinates;
determine a plurality of baseline depth values corresponding to original depth values for proper points on a mark plane, based on the 2D coordinates and the 3D coordinates;
generate a fitting model based on the baseline depth values; and
construct a 3D model of an object by updating a plurality of 3D camera coordinates including one or more depth values of points that are not captured on the mark plane by using the fitting model.

2. The system of claim 1, wherein an image of the object is captured by a 3D camera.

3. The system of claim 2, wherein the processor is to determine a parameter matrix based on the 2D coordinates and the 3D coordinates, wherein the parameter matrix may be used to transform a coordinate in the world coordinate system to a camera coordinate system of the 3D camera.

4. The system of claim 1, wherein the fitting model is to map the original depth values to the baseline depth values.

5. The system of claim 1, wherein the processor is to generate the image of the specified pattern.

6. The system of claim 5, wherein the image of the specified pattern is generated using infrared absorptive liquid.

7. The system of claim 6, wherein the processor is to capture a depth image of the image of the specified pattern.

8. The system of claim 7, wherein the processor is to capture an infrared image of the image of the specified pattern.

9. The system of claim 8, wherein the processor is to determine a relationship between pixels representing detected mark corners in the infrared image and corresponding pixels of the depth image.

10. The system of claim 3, wherein the processor is to identify a line comprising an optical center of the 3D camera within the camera coordinate system.

11. The system of claim 1, wherein the processor includes a graphics processor.

12. The system of claim 1, wherein the mark corners includes at least one of:
a corner of a triangle;
an intersection point of two lines;
a sharpest corner of a geometric figure; and
a symmetric center of a geometric figure.

13. A method for real-time three-dimensional (3D) calibration, comprising:
detecting a plurality of mark corners at a corresponding plurality of two-dimensional (2D) coordinates in an image coordinate system (2D coordinates) of an image of a specified pattern;
determining a plurality of 3D coordinates of the mark corners in a world coordinate system (3D coordinates) based on the specified pattern, wherein the 3D coordinates correspond to the 2D coordinates;
determining a plurality of baseline depth values corresponding to original depth values for proper points on a mark plane, based on the 2D coordinates and the 3D coordinates;
generating a fitting model based on the baseline depth values; and
constructing a 3D model of an object by updating a plurality of 3D camera coordinates including one or more depth values of points that are not captured on the mark plane by using the fitting model, wherein an image of the object is captured by a 3D camera.

14. The method of claim 13, further including generating the image of the specified pattern, wherein the image of the specified pattern is generated using infrared absorptive liquid.

15. The method of claim 13, further including capturing a depth image of the image of the specified pattern.

16. The method of claim 15, further including capturing an infrared image of the image of the specified pattern.

17. The method of claim 16, further including determining a relationship between pixels representing detected mark corners in the infrared image and corresponding pixels of the depth image.

18. The method of claim 13, further including identifying a line comprising an optical center of the 3D camera within the 3D camera coordinates.

19. A tangible, non-transitory computer readable medium for real-time three-dimensional (3D) calibration, comprising a plurality of instructions that, in response to being executed on a processor, cause the processor to:
detect a plurality of mark corners at a corresponding plurality of two-dimensional (2D) coordinates in an image coordinate system (2D coordinates) of an image of a specified pattern;
determine a plurality of 3D coordinates of the mark corners in a world coordinate system (3D coordinates) based on the specified pattern, wherein the 3D coordinates correspond to the 2D coordinates;
determine a plurality of baseline depth values corresponding to original depth values for proper points on a mark plane, based on the 2D coordinates and the 3D coordinates;
generate a fitting model based on the baseline depth values; and
construct a 3D model of an object by updating a plurality of 3D camera coordinates including one or more depth values of points that are not captured on the mark plane by using the fitting model.

20. The tangible, non-transitory medium of claim 19, wherein an image of the object is captured by a 3D camera.

21. The tangible, non-transitory computer readable medium of claim 19, wherein the instructions cause the processor to generate the image of the specified pattern, and wherein the image of the specified pattern is generated using infrared absorptive liquid, and wherein the instructions cause the processor to capture an infrared image of the image of the specified pattern.

22. The tangible, non-transitory computer readable medium of claim 21, wherein the instructions cause the processor to capture a depth image of the image of the specified pattern.

23. The tangible, non-transitory computer readable medium of claim 22, wherein the instructions cause the processor to determine a relationship between pixels representing detected mark corners in the infrared image and corresponding pixels of the depth image, wherein the mark corners are detected by identifying a mark point of the specified pattern that has a smaller angle than remaining angles of the pattern.

24. A system for real-time three-dimensional (3D) calibration, comprising:

means for detecting a plurality of mark corners at a corresponding plurality of two-dimensional (2D) coordinates in an image coordinate system (2D coordinates) of an image of a specified pattern;

means for determining a plurality of 3D coordinates of the mark corners in a world coordinate system (3D coordinates) based on the specified pattern, wherein the 3D coordinates correspond to the 2D coordinates;

means for determining a plurality of baseline depth values corresponding to original depth values for proper points on a mark plane, based on the 2D coordinates and the 3D coordinates;

means for generating a fitting model based on the baseline depth values; and means for constructing a 3D model of an object by updating a plurality of 3D camera coordinates including one or more depth values of points that are not captured on the mark plane based on the fitting model.

25. The system of claim 24, wherein an image of the object is captured by a 3D camera, and wherein the mark corners comprise at least one of:

a corner of a triangle;
an intersection point of two lines;
a sharpest corner of a geometric figure; and
a symmetric center of a geometric figure.

\* \* \* \* \*